Sept. 20, 1960
J. R. YANCEY
2,953,344
VALVE ACTUATING MECHANISM
Filed Nov. 2, 1956
2 Sheets-Sheet 1
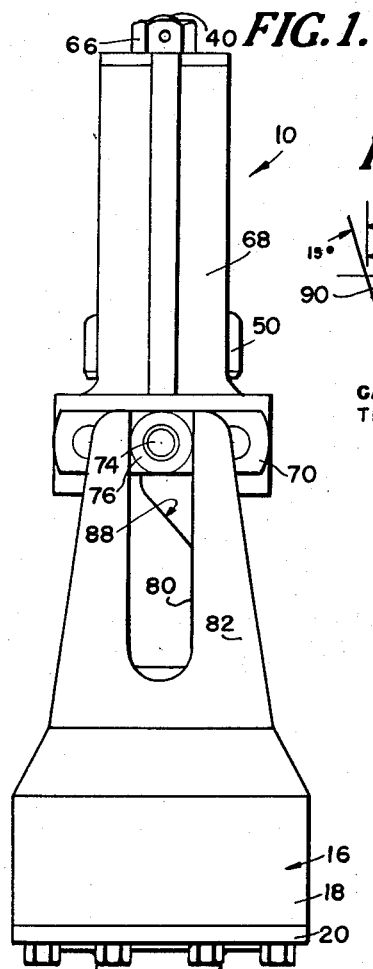
FIG. 1.
FIG. 2.
FIG. 4
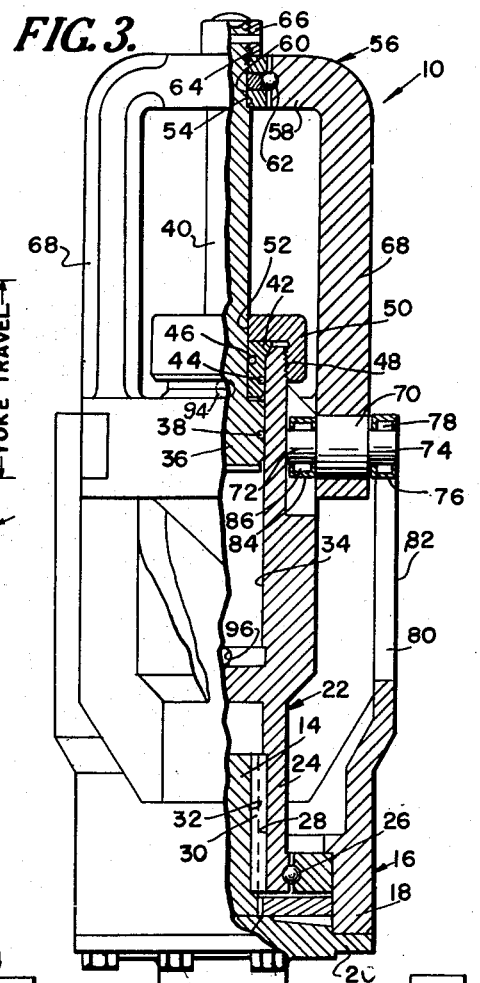
FIG. 3.
INVENTOR
JOHN R. YANCEY
BY Cushman, Darby & Cushman
ATTORNEYS

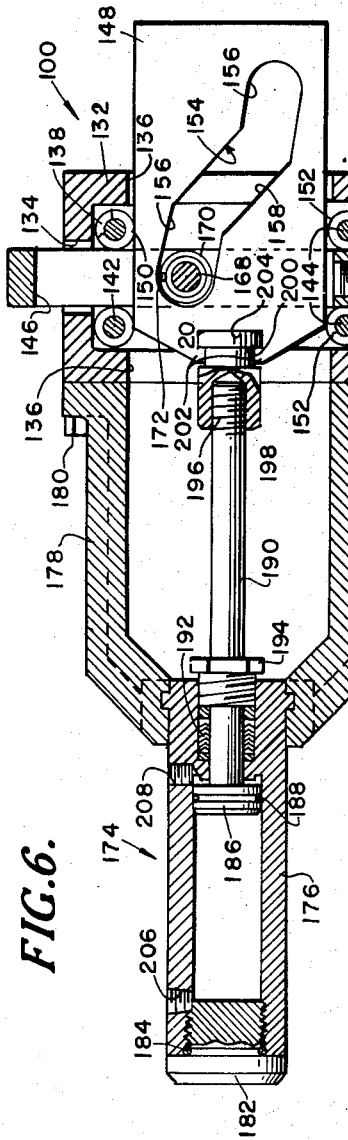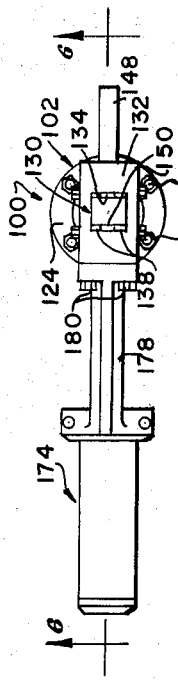
Sept. 20, 1960   J. R. YANCEY   2,953,344
VALVE ACTUATING MECHANISM
Filed Nov. 2, 1956   2 Sheets-Sheet 2
FIG.6.
FIG.5.
INVENTOR
JOHN R. YANCEY
ATTORNEYS United States Patent Office 2,953,344
Patented Sept. 20, 1960

2,953,344

VALVE ACTUATING MECHANISM

John R. Yancey, 3212 Calumet Drive, Houston 4, Tex.

Filed Nov. 2, 1956, Ser. No. 620,100

6 Claims. (Cl. 251—58)

This invention relates to valve actuating mechanisms and more particularly to a valve actuating mechanism having means for transmitting a constant force to move a control member of a valve between open and closed positions with varying force.

It is well known that due to the effects of inertia, as well as the effects of the fluid contained within a valve, the initial movement of the valve control member requires considerable more force than that necessary to continue the movement of the control member once it has been set in motion. Power-operated valve actuating mechanisms presently available all transmit a constant force to the valve control member in order to effect movement thereof between open and closed positions. Consequently, such mechanisms are provided with enough power to effect the initial movement and this power is not used to full advantage after the initial movement has been effected. Moreover, the utilization of this constant source of power when the movement of the valve control member is terminated can prove to be harmful in that it may slam the valve control member shut or open, as the case may be, and damage the valve mechanism.

Accordingly, it is an object of the present invention to provide a valve actuating mechanism including improved means for transmitting a constant force to the valve actuating member of a valve so that a greater force will be transmitted to initiate the movement of the member out of its open position or its closed position than the force transmitted to continue the movement between such positions.

Another object of the present invention is the provision of a valve actuating mechanism including an improved power-operated unit having means incorporated therein for transmitting the movement thereof to a valve control member at varying speeds in accordance with the requirements of the valve member.

Still another object of the present invention is the provision of a valve actuating mechanism which is simple in construction, easy to operate and economical to manufacture and maintain.

These and other objects of the present invention will become more apparent during the course of the following detailed description and appended claims.

The invention may best be understood with reference to the accompanying drawings wherein an illustrative embodiment is shown.

In the drawings:

Figure 1 is an end view of a valve actuating mechanism embodying the principles of the present invention;

Figure 2 is a top plan view of the mechanism;

Figure 3 is a sectional view taken along the line 3—3 of Figure 2;

Figure 4 is a developed diagrammatic view of the cam travel of the mechanism;

Figure 5 is a top plan view of a valve actuating mechanism of modified form which embodies the principles of the present invention; and Figure 6 is a cross-sectional view taken along the line 6—6 of Figure 5.

Referring now more particularly to Figures 1–5, there is shown a preferred form of a valve actuating mechanism, generally indicated at 10, which embodies the principles of the present invention. As shown, the mechanism 10 is applied to a plug valve, indicated at 12, which has the usual rotatable valve plug control member 14 mounted therein. While the mechanism shown in Figures 1–5 is operable to actuate a plug valve, it will be understood that the same may readily be adapted to actuate other types of valves, such as gate valves or the like.

The mechanism 10 comprises a rigid body 16 having a lower cylindrical portion 18 adapted to be suitably mounted on the valve body 12, as by flange 20 or the like, in surrounding relation to the valve plug control member 14. Disposed within the rigid body 16 is a cylinder member 22 having a lower hollow cylindrical portion 24 of reduced diameter rotatably mounted, as by ball bearings 26 or the like, within the lower cylindrical portion of the rigid body. The interior surface of the portion 24 is suitably secured to the valve actuating member 14 and, as shown, may be grooved, as at 28, for receiving a key 30 which is also arranged to engage within a cooperating groove 32 formed in the valve actuating member.

The upper portion of the cylinder member 22 includes a bore 34 extending downwardly therein and forming a cylinder within which a piston 36 is slidably mounted. The piston may be provided with suitable sealing means, such as O-ring seal 38 or the like, and includes an upwardly extending piston rod 40. The upper end of the bore 34 is provided with a sleeve 42 having an O-ring 44 mounted therein for sealing engagement within the upper end of the bore 34. The interior surface of the sleeve 42 is provided with an O-ring seal 46 which engages the exterior surface of a piston rod so as to form a seal therebetween. The upper end of the cylinder is exteriorly threaded, as at 48, so as to threadedly receive an interiorly threaded cap member 50 having a central aperture 52 formed therein through which the piston rod 40 extends.

The upper end of the piston rod is of reduced diameter, as indicated at 54, so as to receive a generally U-shaped yoke member 56. The yoke member includes a bight portion 58 centrally apertured, as at 60, so as to receive the upper reduced end portion 54 of the piston rod. If desired, suitable bearing means, such as ball bearings 62, may be utilized between the yoke and the upper end of the piston rod. In order to mount the yoke on the reduced upper end of the piston rod, the extremity of the latter is threaded, as at 64, so as to receive a nut 66.

The yoke 56 also includes a pair of legs 68, the free end portions of which are provided with elements 70 each having opposed transversely extending inner and outer lugs 72 and 74 formed thereon. Each outer lug 74 has a roller 76 mounted thereon, as by roller bearing 78 or the like, and each roller 76 is arranged to ride within a vertical groove 80 formed in an upper forked portion 82 of the rigid body 16. Each inner lug 72 is provided with a cam roller 84 rotatably mounted thereon as by roller bearing 86. Each cam roller 84 is adapted to ride within a cam groove, generally indicated at 88, and formed in the exterior surface of the upper portion of the cylinder member in surrounding relation to the bore 34.

As diagrammatically shown in Figure 4, the cam groove 88 is formed so that constant movement of the piston will effect a varying rotary movement of the cylinder member. Consequently, due to the variance in the movement of the cylinder member in response to the movement of the piston, the cam groove likewise transmits a varying force to the valve plug control member as a result of the movement of the piston within the cylinder. Since the initial movement of the valve plug control member requires a greater force than continuation of such movement, the end portions of each cam groove are relatively acutely inclined, as indicated at 90 in Figure 4. Between the end portions 90 each cam groove includes an intermediate portion, indicated at 92 in Figure 4, which is at a greater angle than the angle of the end portions 90.

For the purpose of introducing a suitable pressurized fluid into the cylinder 34 so as to effect movement of the piston 36 therein, upper and lower ports 94 and 96 are formed in the upper portion of the cylinder member 22 in communication with the cylinder bore 34. It will be understood that any suitable source of pressurized fluid may be connected with the ports 94 and 96 for the purpose of moving the piston within the cylinder. As shown, the present piston and cylinder unit is arranged to be actuated with hydraulic fluid although it will be understood that other fluids could be utilized.

In operation, it will be seen that, movement of the piston 36 within the cylinder bore 34 will result in a vertical rectilinear movement of the yoke 56 due to its connection with the piston rod 40 and the engagement of the guide rollers 76 within the grooves 80. Since the cam rollers 84 are carried by the yoke 56 and ride within the cam grooves 88, rectilinear movement of the yoke will effect rotary movement of the cylinder member 22. Rotation of the cylinder member 22 will in turn effect rotation of the valve plug control member 14, since the latter is connected with the former through the key 30.

From the above, it can be seen that vertical movement of the cam rollers 84 will effect a rotary movement of the cylinder member 22. The force exerted in rotating the cylinder member as a result of the vertical movement of the yoke member will, therefore, depend upon the inclination of the cam groove 88. Since the yoke moves vertically at a constant rate of speed and with a constant force, the force exerted by the yoke to turn the cylinder member will vary in accordance with the slope of the cam grooves 88. Stated differently, the vertical force of the yoke transmitted to the cylinder member can be broken up into two components; one, the vertical reaction force of the cylinder member, and, two, the horizontal reaction force of the cylinder member. The relative value of these two components of force depends upon the slope of the cam grooves 88. Thus, with a slope which is relatively acute with respect to the vertical, the horizontal component which effects the rotary movement of the cylinder member will be greater than such force where the slope is relatively obtuse. With the present cam groove design, the end portions 90 are straight and are disposed approximately 15° with respect to the vertical, while the intermediate portion is straight and is approximately 45° with respect to the vertical. Thus, movement of the piston from the extreme upper position illustrated in Figure 3, will cause a relatively high turning force to be transmitted to the cylinder member while the cam rollers 84 are in engagement with the upper end portions 90 of the cam grooves. When the intermediate portion 92 of the cam grooves is reached by the cam rollers 84 during the movement of the piston, a reduced turning force is transmitted to the cylinder member and finally toward the opposite extremity of the piston movement, a greater force will be applied similar to that applied in initiating the movement from the opposite extremity.

While the significant feature of the present arrangement is the variance of the force transmitted to the cylinder member so as to apply a greater force to effect the initial movement of the valve out of either its open or closed position, it will be apparent that in conjunction with this variance in force there is also a variance in the speed with which the cylinder member is rotated with the piston moving at a constant rate. Thus, during the initial movement of the piston, the cylinder member will be rotated relatively slow while the cam rollers 84 are in engagement with the end portion 90. The rotational speed of the cylinder member will increase when the intermediate portion 92 is reached and traversed and finally, the speed will again decrease when the cylinder reaches its opposite limit.

In Figures 5 and 6 there is shown another form of a valve actuating mechanism, generally indicated at 100, which embodies the principles of the present invention. The mechanism 100 is shown as being applied to a conventional gate valve, generally indicated at 102. The gate valve includes the usual valve body 104 having valve gate control member 106 mounted therein for vertical movement between open and closed positions. A valve stem member 108 has its lower end journaled within the upper end of the valve gate control member and extends upwardly therefrom. A valve head 110 is mounted on the upper end of the valve body 104 in surrounding relation to the valve stem 108 and has suitable packing 112 mounted therein so as to form a seal around the valve stem. The packing 112 may be retained in position by a sleeve member 114 threadedly mounted within the valve head 110 so as to engage the packing 112. The valve head 110 is retained in position within the upper end of the valve body by means of a nut member 116 threadedly engaged within the upper end of the gate valve body and engaging a suitable flange on the head 110. The upper end of the valve head 110 is exteriorly threaded so as to receive a flanged coupling member 118.

The valve actuating mechanism 100 is mounted on the gate valve 102 and includes a rigid body 120 having a lower cylindrical portion 122 provided with an annular flange 124 at its lower extremity. The flange 124 is secured in engagement with the flanged coupling member 118 by any suitable means, such as bolts 126 or the like. The lower portion 122 of the body 120 is hollow and receives the upper end of the valve stem 108. The latter is threaded, as at 128, so as to receive the lower interiorly threaded end of a follower member 130.

The rigid body 120 also includes an upper end portion 132 which is preferably of box-like construction including an upper wall provided with an aperture 134 for receiving the follower member 130 and a pair of opposite end walls apertured, as at 136, for a purpose hereinafter to be more fully described. The follower member 130 is mounted within the rigid body for vertical reciprocation by means of spaced pairs of upper rollers 138 and spaced pairs of lower rollers 140. The pairs of upper rollers are journaled on horizontally spaced pins 142 secured between the side walls of the upper portion of the rigid body while the pairs of lower rollers 140 are journaled on pins 144 secured between the side walls of the upper portion of the body 120. The follower member 130 is provided with a central elongated slot or opening 146 which receives the central portion of a cam plate 148, the ends of which extend through the apertures 136 in the end walls of the body 120. The cam plate 148 is mounted for horizontal reciprocation by means of a pair of upper rollers 150 journaled on the pins 142 between the associate pair of rollers 138 and a pair of lower rollers 152 journaled on the pins 144 between the associated pair of rollers 140.

A cam groove, generally indicated at 154, is formed in the cam plate in a manner similar to the cam grooves 88 previously described in connection with the embodiment disclosed in Figures 1–5. Thus, the cam groove 154 includes end portions 156 having an inclination of approximately 15° with respect to the horizontal and an intermediate portion 158 inclined at approximately 45°. Mounted within the central portion of the follower member 130 is a shaft 168 which extends across the opening 146 formed therein. A cam roller 170 is journaled on the shaft 168, as by roller bearings 172 or the like, and is arranged to ride in the cam groove 154.

In order to effect horizontal reciprocation of the cam plate 148, there is provided a hydraulic ram unit, generally indicated at 174. The unit includes cylinder 176 having mounted arms 178 extending from one end thereof. The outwardly extending ends of the mounting arms 178 are secured to the adjacent end wall of the upper portion of the rigid body, as by bolts 180 or the like. The opposite end of the cylinder 176 is provided with a threaded plug 182 which may have an O-ring seal 184 mounted therein for engagement with the cylinder so as to provide a pressure-tight seal therebetween. Slidably mounted between the cylinder is a piston 186 provided with suitable sealing means, such as O-ring 188. Extending from the piston and rigidly secured therewith is a piston rod 190 which extends outwardly of the cylinder toward the cam plate 148. The cylinder may be provided with suitable packing 192 which surrounds the piston rod and is held in contact therewith by a threaded sleeve 194 engaged within the adjacent end of the cylinder. The outwardly extending end of the piston rod 190 is exteriorly threaded, as indicated at 196, so as to receive one end of a swivel coupling 198. The opposite end of the swivel coupling is provided with a marginal annular groove 200 which is arranged to receive a pair of opposed projecting ears 202 formed in the adjacent end of the cam plate 148 by a cut-out portion 204.

It will be understood that suitable means may be provided for operating the hydraulic ram unit and for this purpose the cylinder is provided with opposed ports 206 and 208 which permit fluid to be introduced and exhausted from both sides of the piston 186. While the unit is disclosed as being hydraulic, it will be understood that any suitable pressurized fluid may be utilized to actuate the same.

In operation, it will be seen that movement of the hydraulic ram unit will effect a horizontal reciprocation of the cam plate 148. Due to the cam roller 170 riding within the cam groove 154, the follower member 130 will vertically reciprocate in response to the vertical reciprocation of the cam plate 148. Since the follower is connected to the valve stem 128, the control member 106 will be moved between its open and closed positions as a result of the vertical reciprocation of the follower member 130. It will also be understood that since cam groove arrangement 154 is similar to the cam groove arrangement 58 previously described, the forces and movement speeds transmitted to the gate valve control member 106 will be similar to those previously described in connection with the valve control 14 of the first embodiment.

It can thus be seen that there is provided a valve actuating mechanism which includes a power source which has a constant movement and a constant force application, and means for transmitting the movement and force of the power-operated unit to the valve control member of a valve so that maximum force is applied to the valve member to initiate movement out of both its open position and its closed position and for transmitting maximum movement to the valve member once the latter has been set into motion. The motion-transmitting arrangement of the present invention constitutes a definite improvement over the mechanisms heretofore utilized which embodied a constant speed and force application on the valve control member. With a constant force and speed applied to the control member, the power requirements which are necessary to initiate the movement of the control member is not utilized to its fullest advantage if constant movement is maintained.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. An actuating mechanism for a rotary valve comprising a rigid support body having a longitudinally extending slot formed therein, a member rotatably mounted through said rigid body, a piston and cylinder unit mounted on said rigid body, the cylinder on said unit being movably mounted with respect to said rigid body and having a cam groove formed in the exterior surface thereof transversely of said longitudinal slot, means connecting the cylinder with the rotatably mounted member so that the latter will be moved in accordance with the movement of the cylinder, and cam follower means attached to said piston and operating in said slot between said rigid body and said cam groove for effecting the movement of the cylinder and the rotatably mounted member in response to the movement of the piston therein.

2. A valve actuating mechanism for a rotary valve comprising a rigid body member, a cylinder member rotatably mounted on said body member and having means thereon for connection with an element to be rotated, a piston slidably mounted within said cylinder member, a piston rod secured to said piston and extending outwardly of said cylinder member, motion transmitting means secured to the outwardly extending end portion of said piston rod for longitudinal movement therewith, longitudinally extending guide and guide engaging means between said motion transmitting means and one of said members, and transversely extending cam surface and cam means between said motion transmitting means and the other of said members.

3. A valve actuating mechanism as defined in claim 2 wherein said motion transmitting means comprises a U-shaped yoke having a bight portion secured to the outwardly extending end of said piston rod and a pair of yoke legs, the free ends of which are disposed on opposite sides of said cylinder member.

4. A valve actuating mechanism as defined in claim 3 wherein said guide and guide engaging means comprises outwardly extending rollers carried by the free ends of said yoke legs, said body member having opposed longitudinally extending grooves formed therein for receiving said rollers.

5. A valve actuating mechanism as defined in claim 3 wherein said cam surface and cam means includes inwardly extending rollers mounted on said yoke legs for rotation about an axis common with the axis of rotation of said outwardly extending rollers.

6. A valve actuating mechanism as defined in claim 5 wherein said cam surface and cam means further includes a pair of opposed cam grooves formed in the exterior periphery of said cylinder member for receiving said inwardly extending rollers, said cam grooves being formed so as to apply greater force at their extreme ends than at their intermediate portion.

References Cited in the file of this patent

UNITED STATES PATENTS

| 353,134 | Hands | Nov. 23, 1886 |
|---|---|---|
| 1,854,531 | Tweit | Apr. 19, 1932 |
| 2,315,775 | D'Arcey | Apr. 6, 1943 |
| 2,709,451 | LaBour | May 31, 1955 |

FOREIGN PATENTS

| 641,998 | France | Aug. 14, 1928 |
|---|---|---|
| 1,104,892 | France | June 22, 1955 |